UNITED STATES PATENT OFFICE.

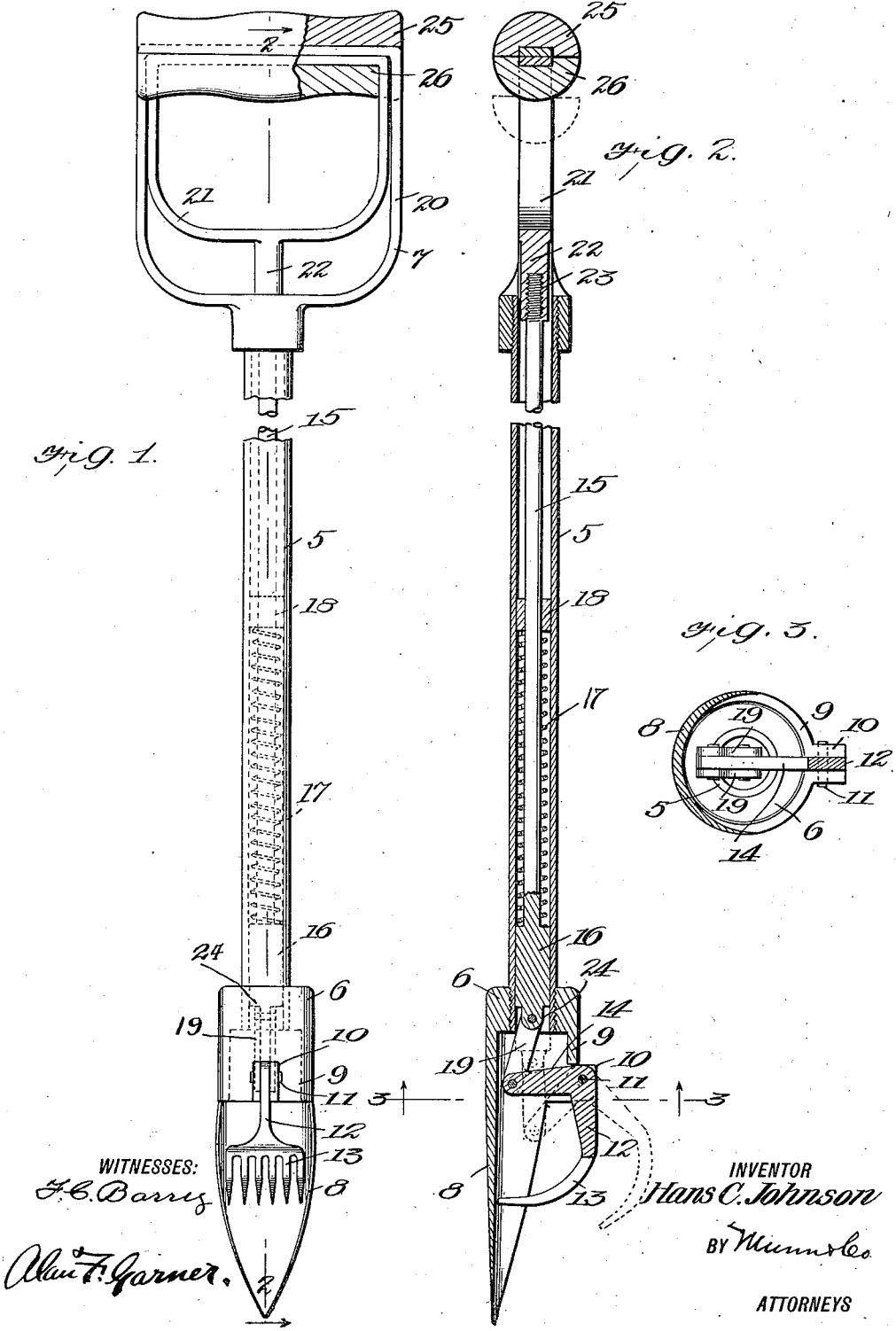

HANS C. JOHNSON, OF FORT BRAGG, CALIFORNIA.

WEED-PULLER.

1,245,924.     Specification of Letters Patent.     Patented Nov. 6, 1917.

Application filed January 20, 1915. Serial No. 3,274.

*To all whom it may concern:*

Be it known that I, HANS C. JOHNSON, a citizen of the United States, residing at Fort Bragg, in the county of Mendocino and State of California, have invented certain new and useful Improvements in Weed-Pullers, of which the following is a specification.

This invention relates to an improvement in weed pullers, and one of the principal objects of the invention is to provide a weed puller by means of which weeds may be extracted from lawns or gardens or the like without the necessity of having to bend over or stoop or crawl in order to get at the weeds.

Another object of the invention is to provide a weed puller including a blade or scoop attached to a suitable stem which may be manipulated by the operator and by which mechanism is carried for engaging the weed upon sinking of the scoop in the earth alongside the weed whereby to grasp the weed for extracting it.

Still another object of the invention is to provide a device of the class described which will be extremely simple, durable, efficient in operation and inexpensive to manufacture.

With these and other objects in view which will become apparent as the description proceeds, the invention resides in the construction, combination and arrangement of parts, hereinafter more fully described and claimed, and illustrated in the accompanying drawing, in which like characters of reference indicate like parts throughout the several figures, of which—

Figure 1 represents an elevational view of a weed puller constructed according to my invention.

Fig. 2 represents a view in longitudinal section taken centrally on the plane indicated by the line 2—2 of Fig. 1 looking in the direction indicated by the arrows, and Fig. 3 represents a view in horizontal section taken on the plane indicated by the line 3—3 of Fig. 2 looking in the direction indicated by the arrows.

In carrying out my invention I provide a hollow stem or tube 5 at one end of which a circular metallic head 6 is threadedly connected, and at the opposite end of which a fixed handle 7 is threadedly connected.

Head 6 has a scoop or blade 8 formed integrally therewith, which blade tapers along its edges from adjacent the head to the lower point of the scoop where the edges meet. Transversely the scoop is crescent shaped in cross section as indicated in Fig. 3. At the point where the blade or scoop merges with the head, said blade extends substantially one-half way around the perimeter of the head the remainder of the perimeter being occupied by a depending flange 9, formed integrally with said head.

The flange at a point diametrically opposed to a point in the central longitudinal line of the scoop, is recessed in its lower edge and is provided with spaced ears 10. Between these ears is pivoted at 11 the upper end of a shank 12 which at its lower end carries a plurality of tines or prongs 13. Formed integrally with shank 12 and extending at right angles thereto from the upper end thereof, is an arm 14, which projects toward scoop 8 and extends through the recess in flange 9 adjacent ears 10.

Slidably disposed within the tube or stem 5 is a rod 15. This rod is at the end adjacent head 6 enlarged as at 16, so as to snugly fit within the stem at the enlarged end, whereby the rod may be guided in its movement longitudinally of the tube, and whereby a shoulder for the reception of a coiled spring 17 may be formed. This spring is interposed upon rod 15 between the shoulder formed by enlargement 16, and a collar 18 secured to and within the stem 5. A pair of links 19 are pivotally connected at their ends to the free end of arm 14 on opposite sides thereof and to a lug 24 formed on the lower end of rod 15, whereby upon longitudinal movement of the rod the forks or claws may be rocked toward and away from the scoop 8.

The fixed handle 7 it will be noted is preferably formed with parallel side pieces 20, and slidably disposed within this fixed handle 7 is a movable handle 21. The latter carries a lug or shank 22 into which is threaded the upper end of rod 15 at 23. Secured upon each of the handles 7 and 21, is a hand hold 25 and 26 respectively. They may be made of wood or other suitable material, and are substantially semicircular in cross section. The hand hold carried by movable handle 21 is recessed at its ends, for the reception of the members 20 of handle 7 whereby said handle 21 is guided in its reciprocal movement within the fixed handle.

The normal tendency of spring 17 is to maintain rod 15 in its lowermost position relatively to stem 5, and to consequently maintain the prongs or claws 13 normally in outward position relatively to scoop 8, as indicated by dotted lines in Fig. 2. In operation the implement is disposed alongside a weed and the scoop or blade then forced into the earth adjacent the roots of the weed. The movable handle is then grasped and drawn upwardly, by a mere contraction of the fingers of the operator, thus swinging the prongs against the scoop and impaling or binding the weed against the scoop, whereupon by continuing the grasp on the movable handle, and by withdrawing the implement from the earth the weed will be readily extracted.

The device is particularly simple in its construction, and is also extremely efficient in its operation. The parts are readily removable for renewal or sharpening. The instrument is also capable of manufacture at very low cost.

Although I have described the preferred embodiment of my invention, I may desire to make such changes in the construction, combination and arrangement of parts thereof as do not depart from the spirit of the invention and the scope of the appended claim.

I claim:—

A weed puller comprising a hollow stem, a circular head threaded on one end thereof, and having a scoop provided thereon, and further having a depending flange forming a continuation of the upper portion of the scoop, said flange at a point opposite the center of the scoop being provided with a slot extending from its lower edge, a shank arranged normally in substantially parallel relation with the scoop, said shank extending at its upper end within the slot and being pivoted to the flange and having an arm extending inwardly toward the scoop and at right angles to the shank, means carried within the stem for operating the shank, means arranged within the depending flange connecting the operating means and the inwardly extending arm, and earth engaging means carried by the shank for coöperating with the scoop.

HANS C. JOHNSON.

Witnesses:
J. K. Peirsol,
R. D. Swales.